United States Patent Office 2,987,639
Patented June 6, 1961

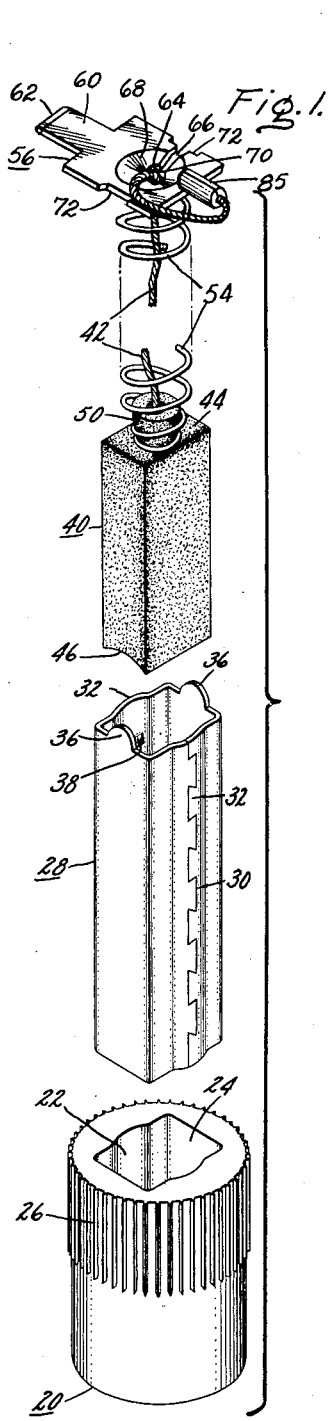
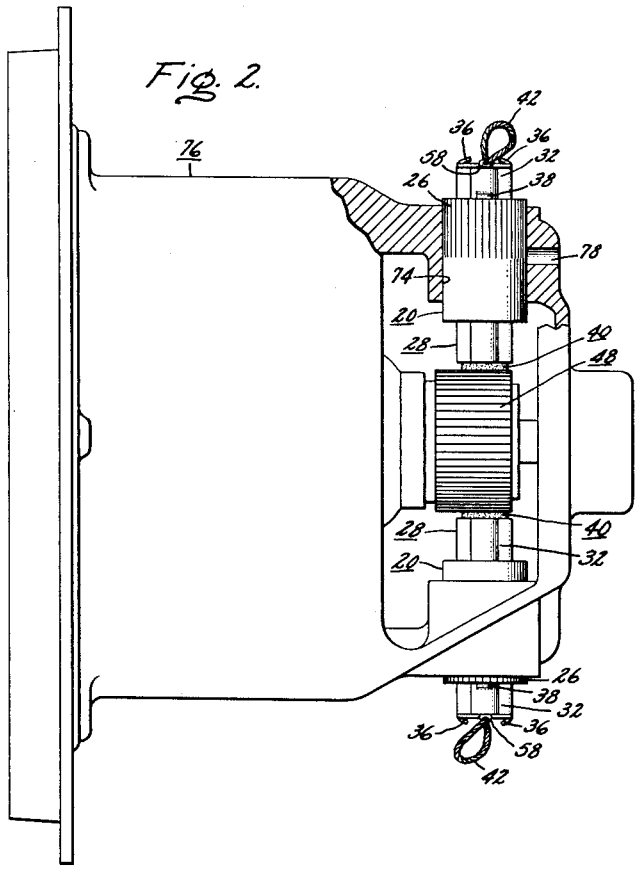
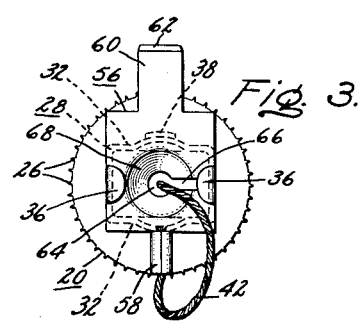
Inventors:
Frank K. Bayless,
Daniel H. Brennan,
by Armand Cifelli
Their Attorney.

2,987,639
MOTOR BRUSH ASSEMBLY
Frank K. Bayless and Daniel H. Brennan, Cleveland Heights, Ohio, assignors to General Electric Company, a corporation of New York
Filed Mar. 11, 1959, Ser. No. 798,686
15 Claims. (Cl. 310—247)

This invention relates to a low cost brush assembly for electric motors. More particularly, it relates to such an electric brush assembly which has the multiple advantages of ease and economy of fabrication, assembly and installation in a motor housing.

As is well known, armature wound motors having segmented commutators or slip rings must have conducting brushes for providing electrical connection to the armature windings. These brushes are ordinarily of solid graphite material which is spring pressed into conductive engagement with a cylindrical commutator, or slip ring. Provision must be made for containing these brushes in the motor housing generally radially disposed to the segmented commutator or slip rings. Provision must also be made for an external conducting link from the brushes to power terminals, or to the rest of the motor circuit. Ordinarily the brushes are contained in a separate motor brush assembly which, when inserted into the motor housing, serves the follower purposes: (a) it aligns the brush with the commutator, (b) it provides a spring bias to hold the brush in conductive engagement against the commutator, (c) it provides a continuous circuit connection to the brush, (d) it provides a terminal for the connection of the brush into the motor circuit, and (e) it insulates the brush from the motor housing and other motor parts. In the prior art, these motor brush assemblies have often taken complex forms having many separate parts which had to be assembled, including screws, machine bored pieces, and other parts requiring costly close tolerance machining. Often the metallic brush holders have required complex metal forming techniques. Consequently, the prior art motor brush assemblies have entailed high costs of fabrication, assembly and installation.

Accordingly, it is a principal object of this invention to provide a low cost motor brush assembly. A further object of the invention is to provide a motor brush assembly of the above character which may be assembled easily and inexpensively by the manufacturer. Another object of the invention is to provide a motor brush assembly of the above character having an inexpensive insulating sleeve adapted for mounting in motor housings without requiring close dimensional tolerance. Still another object of the invention is to provide apparatus of the above character in which the brush holder cap and terminal are combined into a single integral piece. Other objects of the invention are to provide such a motor brush assembly having a minimum of parts which are relatively easy to fabricate without requiring close tolerance machining nor complex metal forming techniques. A final stated object of the invention is to provide a low cost motor brush assembly of the above character which is easily inserted into a motor housing and is adapted for simple cementing thereto. Other objects of the invention will in part be obvious and will in part appear hereinafter.

The invention accordingly comprises articles of manufacture possessing the features, properties, combinations of elements and arrangements of parts as will be exemplified in the articles and combinations hereinafter described, and the scope of the invention will be indicated in the claims.

For a fuller understanding of the nature and objects of the invention, reference should be had to the following detailed description taken in conjunction with the accompanying drawing in which:

FIG. 1 is an exploded perspective view of the preferred embodiment of the present invention;

FIG. 2 is a side elevation, partially cut away, of the preferred embodiment of the present invention as installed in a motor housing;

FIG. 3 is an end view of the preferred embodiment of the present invention.

Similar reference characters refer to similar elements throughout the several views of the drawing.

In general, the apparatus of the present invention consists of a carbon brush having an integral pigtail, a biasing spring, a sleeve-like metal brush holder having a dovetailed seam, a plastic insulator shrunk fitted around the brush holder, the plastic insulator having serrations on its periphery so as not to require close tolerance in its peripheral dimension nor in the dimension of the bore in the motor housing which is to contain it, and a cap terminal piece having a slotted hole and crimping tab for attaching and guiding the brush pigtail and a terminal tab for connection of a conducting lead from the rest of the motor circuit. The cap piece is held against the outer end of the metal brush holder by means of tabs which are folded over the cap at the outer end of the brush holder.

More particularly, referring to FIGURE 1, the motor brush assembly of the present invention comprises an insulating bushing 20 of generally cylindrical outer configuration having a longitudinal cylindrical bore 22 symmetrically located about the major axis thereof and passing through the entire length of the insulating bushing. A generally rectangular bore 24 also symmetric to the major axis passes through the insulating bushing 20. Additionally the insulating bushing 20 has serrations 26 located around its outside periphery over a portion of its length and disposed substantially parallel to the major axis.

The metal brush holder 28 substantially conforms in cross-section to the configuration of the inner bores in the insulating bushing 20. The brush holder is joined to form a rigid structure along the dovetailed interlocking seam 30 which is longitudinally disposed along one of the faces thereof. The faces 32—32 of the brush holder 28 deviate in cross-section from straight lines along arcs of a circle symmetrically disposed in respect to the faces. Thus provision is made for either a cylindrical or parallelopiped brush and for guiding a biasing spring as will be discussed below. A pair of tabs 36—36 are located at one end of the brush holder 28 at the termination of the two oppositely disposed faces adjacent to the face containing the interlocking seam 30. A detent 38 at the tabbed end of the brush holder is disposed in the face thereof opposite the face containing the interlocking seam 30. This detent 38 projects outwardly from the brush holder 28 and away from the tabs 36—36.

The brush 40 is of substantially right parallelopiped configuration and is adapted to loosely fit within the sleeve-like brush holder 28. Brush 40 may be formed of molded carbon material, such as a graphite composition, and preferably is provided with a substantially cylindrical neck portion 50 at one end. The opposite end 46 of brush 40 is curved to conform with the cylindrical contour of the commutator 48 (Fig. 2). A stranded pigtail 42 or flexible, electrically conductive wire is symmetrically attached at the upper end face 44 of the brush 40. A compression spring 54 is seated around the neck 50 of brush 40. This centers the biasing spring 54 and thus facilitates the more positive application of the biasing force. The spring 54 may be chosen to have a diameter greater than the distance between the faces 32—32 of the brush holder 28. The spring 54 will then be guided by the cylindrical formation in the faces 32—32 further facilitating the positive application of the biasing force.

The pigtail 42 is attached to a one piece cap-terminal 56 by means of a crimping tab 58 integral therewith. On the opposite edge of the cap-terminal 56 there is provided a terminal tab 60 having a beveled tongue-like end 62 which is adapted to accept and hold a female terminal lug (not shown). The cap-terminal 56 is formed with a centrally disposed countersunk hole 64 and a radial slot 66 communicating between the hole 64 and one edge of the cap-terminal. In forming the cap-terminal 56, which may be done by stamping, a collar 70 is provided on the countersunk guide hole boss portion 68 to prevent fraying of the pigtail conductor 42 where it passes through hole 64. Tab accepting notches 72—72 are located on opposite edges of the cap-terminal 56, to engage the tabs 36—36 of brush holder sleeve 28.

The brush assembly of the invention is fabricated and assembled in the following manner. Again referring to Fig. 1, the sleeve-like brush holder 28 is stamped from a substantially rectangular flat piece of metal, preferably half hard brass. It is then formed by conventional fabricating techniques into its sleeve-like configuration. The cap-terminal 56 is also stamped from a single piece of material, preferably half hard brass. The insulating bushing 20 is molded from plastic material, preferably a cotton flock filled phenolic plastic. Immediately after the molding process, the brush holder 28 is inserted into the insulating bushing up to the detent 38 on the brush holder which comes to rest against the serrated end of the insulating bushing. The insulating bushing then shrinks around the brush holder making a very tight permanent fit. The dovetailed interlocking seam 30 on the brush holder 28 facilitates this technique of shrink fitting the insulating bushing about the brush holder by adding to the structural rigidity of the brush holder.

The conducting pigtail 42 of the brush 40 is inserted longitudinally through the biasing spring 54. The pigtail 42 is then crimped within the crimping tab 58, thus connecting the cap-terminal 56, biasing spring 54, pigtail 42, and brush 40 into a single integrated unit. The spring 54 is manually compressed and the pigtail drawn over the outer side of the cap-terminal 56 and inserted through the slot 66 into the hole 64 (Fig. 3).

A bore 74 is made or has been cast in the motor housing 76 (Fig. 2). The diameter of this bore is larger than the diameter of the plain portion of the insulating bushing 20 and smaller than the diameter of serrated portion of the insulating bushing. This allows the serrations 26 to compensate for the low tolerances in the dimensions of the diameters of the insulating bushing 20 and the bore 74. The brush holder and bushing assembly is immersed in a sealant activator and allowed to dry. The assembly is then forceably inserted into the bore 74 and a few drops of sealant are placed in a hole 78 in the motor housing leading to the bore 74 to cement the assembly in place. The brush, biasing spring and cap-terminal assembly is then inserted into the brush holder 28, and the tabs 36—36, which fit into the tab slots 72—72, are crimped over so as to hold the cap-terminal 56 against the brush holder 28. Assembly into the motor housing 76 is then complete.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What we claim as new and desire to secure by Letters Patent of the United States is:

1. A brush assembly for electric motors comprising in combination, a peripherally serrated insulating bushing shrink fitted around a sleeve-like brush holder, a carbon brush disposed in said brush holder, a flexible conducting wire lead having one end thereof integral with said brush, a spring contained within said brush holder and adapted to bias said brush into conductive engagement with a motor commutator, said flexible lead passing substantially axially through said spring, a cap-terminal having a slotted flexible lead guide hole boss, a crimping tab on said cap engaging the other end of said flexible lead, and an external brush lead terminal integral with said cap, said brush holder having tabs at the cap end thereof for retaining said cap-terminal in engagement therewith against the end of said brush holder.

2. The combination of claim 1, in which the serrations on said insulating bushing are in the form of a plurality of substantially equally spaced parallel rib portions extending beyond a substantially cylindrical body portion and deformable under pressure to conform to the inside dimensions of a mounting hole in the motor housing within which it is to be contained.

3. The combination of claim 1 in which said flexible lead guide hole boss is counter-sunk to form a circular indentation protruding from one side of said cap-terminal substantially concentric with the axis of the guide hole therein, and said spring is in the form of a coil having one end thereof engageable with and centrally positioned by said indentation.

4. The combination of claim 3 in which said indentation is further defined by a collar portion substantially surrounding said guide hole to reduce abrading of said flexible conductor lead passing therethrough.

5. The combination of claim 1 in which said brush holder has a detent therein disposed adjacent to the cap-terminal end thereof and projecting outwardly and away from said cap-terminal end thereof for engaging the end of said insulating bushing to position said brush holder in said insulating bushing during assembly of said brush holder and insulating bushing.

6. The combination of claim 1 in which said brush holder is fabricated of a single metallic plate formed into a sleeve with an interlocking seam extending longitudinally thereof.

7. The combination of claim 6 in which said interlocking seam is formed of a plurality of dovetailed portions.

8. The combination of claim 6 in which said brush holder is of folded construction and forms a sleeve having a plurality of substantially plane faces and said interlocking seam is located in one of the faces thereof.

9. A brush holder for electric motors comprising a metal sleeve of substantially rectangular cross-section having a dovetailed interlocking seam longitudinally located along one face thereof, and in which the cross-sectional configuration thereof deviates from rectangular along a circle the origin of which is located in the geometric center of said cross-sectional configuration and the diameter of which is greater than the width and less than the length of said rectangular cross-sectional configuration.

10. A brush holder assembly for electric motors comprising a sleeve-like metal brush holder of substantially rectangular cross-section having a dovetailed interlocking seam longitudinally located along one face thereof, and a peripherally serrated insulating bushing shrink fitted around said metal brush holder.

11. A brush holder assembly for electric motors comprising a sleeve-like metal brush holder of substantially rectangular cross-section having a dovetailed interlocking seam longitudinally located along one face thereof, a plurality of deformable tabs formed on one end of said brush holder, and a cap terminal secured against said end of said brush holder by said tabs.

12. The combination defined in claim 10 in which said insulating bushing is fabricated of cotton flock filled phenolic plastic.

13. The combination of claim 11 in which said cap-terminal has a crimping tab integral therewith adapted to connect and to hold one end of a flexible conductor attached to a carbon brush, and a slotted hole substantially centrally located in said cap-terminal adapted to accept said conductor after crimping and to position said conductor substantially centrally within the end of said brush holder after assembly of said brush holder and said cap-terminal.

14. The combination defined in claim 13 in which said cap-terminal has a depression therein at and around the position of said hole for engaging and positioning the end of a brush biasing spring contained within said brush holder when assembled.

15. The combination of claim 14 in which said cap-terminal includes an external conductive tab integral therewith and forming a male member for connection with a lead terminal connector.

References Cited in the file of this patent
UNITED STATES PATENTS
1,405,596    Karle _____ Feb. 7, 1922